United States Patent
Lin et al.

(10) Patent No.: US 8,168,091 B2
(45) Date of Patent: May 1, 2012

(54) POLYVINYL ALCOHOL FILM COMPOSITION, AND POLARIZING PLATE EMPLOYING THE SAME

(75) Inventors: Ho-May Lin, Hsinchu (TW); Wei-Chih Wang, Banqiao (TW); Hui-Chun Pen, Hsinchu County (TW)

(73) Assignee: Industrial Technology Research Institute, Hsinchu County (TW)

( * ) Notice: Subject to any disclaimer, the term of this patent is extended or adjusted under 35 U.S.C. 154(b) by 18 days.

(21) Appl. No.: 12/566,655

(22) Filed: Sep. 24, 2009

(65) Prior Publication Data

US 2010/0270518 A1 Oct. 28, 2010

(30) Foreign Application Priority Data

Apr. 27, 2009 (TW) .............................. 98113863 A

(51) Int. Cl.
*F21V 9/14* (2006.01)
*G02B 5/30* (2006.01)
*G02C 7/12* (2006.01)
*B32B 9/04* (2006.01)

(52) U.S. Cl. .................... 252/585; 359/485.01; 428/447

(58) Field of Classification Search .................. 252/585; 359/485, 485.01; 523/128; 524/47, 296, 524/321, 284, 290; 525/220; 428/447
See application file for complete search history.

(56) References Cited

U.S. PATENT DOCUMENTS

| 2006/0057402 A1* | 3/2006 | Augustine et al. | 428/447 |
| 2007/0190385 A1* | 8/2007 | Lee et al. | 429/33 |
| 2008/0118667 A1* | 5/2008 | Kasahara et al. | 428/1.1 |

FOREIGN PATENT DOCUMENTS

| JP | H10-003007 A | 6/1998 |
| JP | 2006-307058 A | 11/2006 |
| JP | 2007-154000 A | 6/2007 |
| WO | 2008/021455 A2 | 2/2008 |

OTHER PUBLICATIONS

Hybrid Plastics, Nanostructured® POSS® Chemicals, http://www.hybridplastics.com/products/catalog.htm, Dec. 6, 2010.*

* cited by examiner

*Primary Examiner* — Ling Choi
*Assistant Examiner* — Bijan Ahvazi
(74) *Attorney, Agent, or Firm* — Pai Patent & Trademark Law Firm; Chao-Chang David Pai

(57) ABSTRACT

The invention provides a polyvinyl alcohol film composition including: (A) 100 parts by weight of polyvinyl alcohol; and (B) 0.001 to 30 parts by weight of a multi-hydroxyl polyhedral oligomeric silsesquioxane (POSS). The POSS is soluble in polar solvents, but insoluble in water. The invention also provides a polarizing plate containing the polyvinyl alcohol film composition.

9 Claims, 1 Drawing Sheet

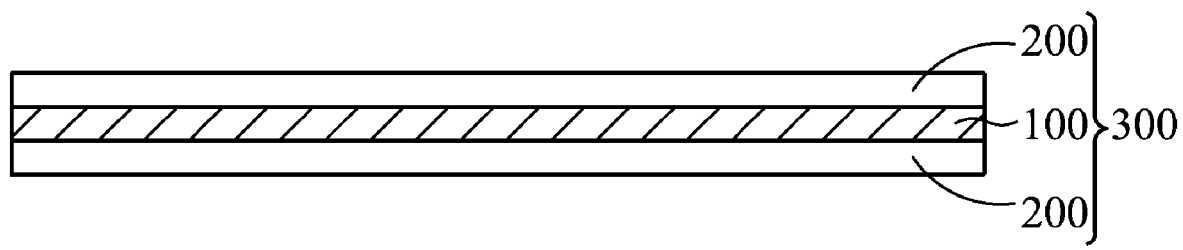

POLYVINYL ALCOHOL FILM COMPOSITION, AND POLARIZING PLATE EMPLOYING THE SAME

CROSS REFERENCE TO RELATED APPLICATIONS

This application claims priority of Taiwan Patent Application No. 098113863, filed on Apr. 27, 2009, the entirety of which is incorporated by reference herein.

BACKGROUND OF THE INVENTION

1. Field of the Invention

The present invention relates to a polyvinyl alcohol film composition suitable for use as an optical film, packaging film, agricultural film, laundry bags, cosmetic film and particularly, polarizing film.

2. Description of the Related Art

Polyvinyl alcohol (PVA) is a stable, non-toxic water-soluble polymer, which has a good adhesion, elongation, solvent resistance, wear resistance, oxygen barrier properties, and surface activity. Due to the desirable characteristics, PVA is used in various industries, such as the electronics, opto-electronics, textile, latex, plywood, and so on. In addition, PVA has good film-forming properties. PVA films have better physical properties, such as tensile strength, tear strength, and wear resistance, than films made of other water-soluble polymers. Typically, PVA films are prepared by solvent casting, wherein a PVA solution is coated by a drum type or belt type coater, and dried in a thermal process. PVA films may be subjected to water-swelling, monoaxial stretching, and dyeing to form polarizing films. A polarizing film is typically combined with triacetyl cellulose (TAC) films to provide a polarizing plate, one of the key components in display devices.

A polarizing film having a high degree of polarization can be obtained by using a high stretch ratio during monoaxial stretching. To increase elongation of PVA films, a plasticizer is usually required. Plasticizers commonly used for PVA films include glycols, polyols, and amines, and the most common plasticizer is glycerine. A problem with PVA films is the migration or exudation of the plasticizer to the film surface, resulting in a sticky surface. In addition, because the plasticizer is substantially water-soluble, a considerable amount of the plasticizer is lost in the aqueous processing tanks during fabrication of polarizing films. Such tanks include swelling tanks, iodine-dyeing tanks, stretching tanks, and fixation tanks. The loss of the plasticizer can cause undesirable stiffening of PVA films, which ultimately leads to degradation of elongation, physical properties, and optical properties.

References may be made to Japanese Patent Publication Nos. 10-003007, 2006-307058, and 2007-154000, for further description of conventional PVA film compositions and their fabrication.

Accordingly, it is highly desirable to provide a PVA film composition having a low water leachability, wherein the loss of the plasticizer in processing tanks during fabrication of polarizing films can be reduced.

BRIEF SUMMARY OF THE INVENTION

A polyvinyl alcohol film composition is provided, comprising: (A) 100 parts by weight of polyvinyl alcohol; and (B) about 0.001 to 30 parts by weight of a multi-hydroxyl polyhedral oligomeric silsesquioxane (POSS), wherein the multi-hydroxyl POSS is soluble in polar solvents, but insoluble in water.

A polarizing plate is also provided, comprising a polarizing film having the above described composition; and a protective film provided on at least one surface of the polarizing film.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1 is cross section of a polarizing plate according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The polyvinyl alcohol film composition of the invention features a multi-hydroxyl polyhedral oligomeric silsesquioxane (POSS) as a plasticizer. The multi-hydroxyl POSS is soluble in polar solvents, but insoluble in water and therefore less prone to losing plasticizer in processing tanks during fabrication of polarizing films. The polyvinyl alcohol films formed of the present composition is generally characterized with high tensile strength, high water contact angle, and low water leachability.

The polyvinyl alcohol film composition of the invention includes at least:

(A) 100 parts by weight of polyvinyl alcohol; and (B) about 0.001-30 parts by weight, preferably 0.01-20 parts by weight, more preferably 0.1-18 parts by weight, of a multi-hydroxyl polyhedral oligomeric silsesquioxane (POSS), wherein the multi-hydroxyl POSS is soluble in polar solvents, but insoluble in water.

In general, the polyvinyl alcohol (A) used herein has a degree of polymerization of about 500-10000, preferably about 500-6500, and a degree of saponification of above 75 mol %, preferably above 80 mol %, more preferably above 99 mol %.

Polyhedral oligomeric silsesquioxanes (POSS) have attracted considerable attention because of their unique hybrid organic/inorganic molecular structures and nanoscale sizes. Polyhedral oligomeric silsesquioxanes are mainly used as nano-fillers (WO 2008/021455) and electrolyte membranes for fuel cells (US 2007/0190385). The conventional art does not disclose, however, the application of a multi-hydroxyl POSS.

The multi-hydroxyl POSS (B) used herein is characterized by two or more hydroxyl groups in its molecule. Examples of the multi-hydroxyl POSS (B) include, but are not limited to, compounds of Formula (I)-(VII), wherein each of the $R_1$-$R_{12}$, independently, is a $C_1$-$C_{12}$ aliphatic group or a $C_3$-$C_{14}$ aromatic group.

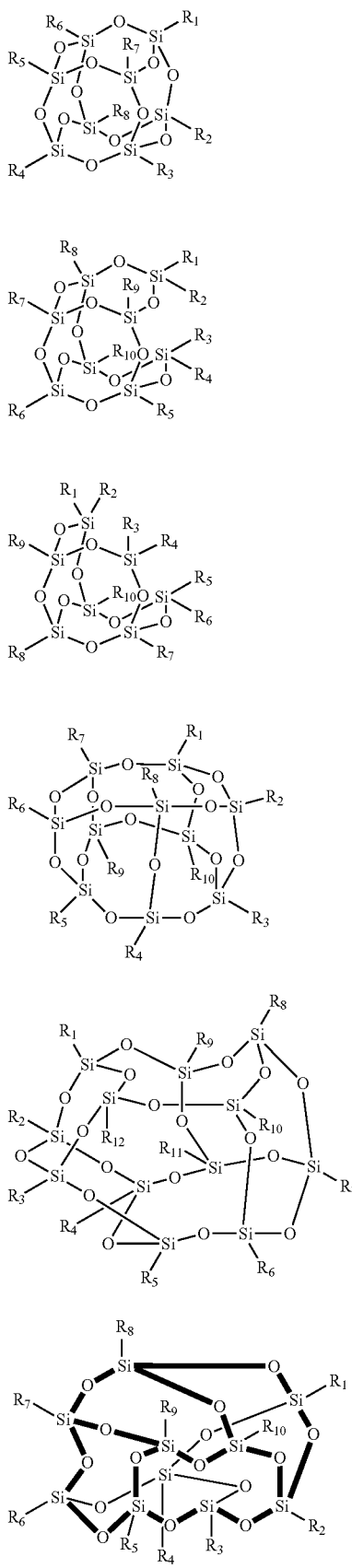

(I)

(II)

(III)

(IV)

(V)

(VI)

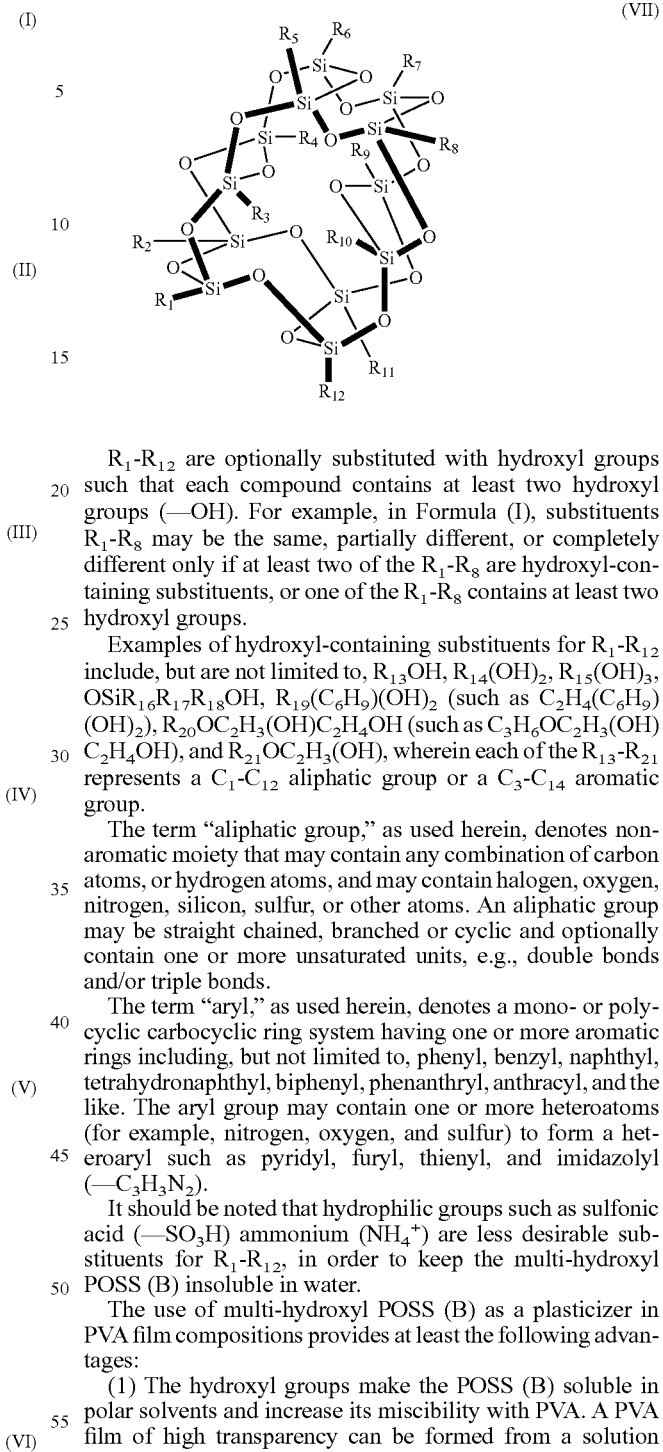

(VII)

$R_1$-$R_{12}$ are optionally substituted with hydroxyl groups such that each compound contains at least two hydroxyl groups (—OH). For example, in Formula (I), substituents $R_1$-$R_8$ may be the same, partially different, or completely different only if at least two of the $R_1$-$R_8$ are hydroxyl-containing substituents, or one of the $R_1$-$R_8$ contains at least two hydroxyl groups.

Examples of hydroxyl-containing substituents for $R_1$-$R_{12}$ include, but are not limited to, $R_{13}OH$, $R_{14}(OH)_2$, $R_{15}(OH)_3$, $OSiR_{16}R_{17}R_{18}OH$, $R_{19}(C_6H_9)(OH)_2$ (such as $C_2H_4(C_6H_9)(OH)_2$), $R_{20}OC_2H_3(OH)C_2H_4OH$ (such as $C_3H_6OC_2H_3(OH)C_2H_4OH$), and $R_{21}OC_2H_3(OH)$, wherein each of the $R_{13}$-$R_{21}$ represents a $C_1$-$C_{12}$ aliphatic group or a $C_3$-$C_{14}$ aromatic group.

The term "aliphatic group," as used herein, denotes non-aromatic moiety that may contain any combination of carbon atoms, or hydrogen atoms, and may contain halogen, oxygen, nitrogen, silicon, sulfur, or other atoms. An aliphatic group may be straight chained, branched or cyclic and optionally contain one or more unsaturated units, e.g., double bonds and/or triple bonds.

The term "aryl," as used herein, denotes a mono- or poly-cyclic carbocyclic ring system having one or more aromatic rings including, but not limited to, phenyl, benzyl, naphthyl, tetrahydronaphthyl, biphenyl, phenanthryl, anthracyl, and the like. The aryl group may contain one or more heteroatoms (for example, nitrogen, oxygen, and sulfur) to form a heteroaryl such as pyridyl, furyl, thienyl, and imidazolyl (—$C_3H_3N_2$).

It should be noted that hydrophilic groups such as sulfonic acid (—$SO_3H$) ammonium ($NH_4^+$) are less desirable substituents for $R_1$-$R_{12}$, in order to keep the multi-hydroxyl POSS (B) insoluble in water.

The use of multi-hydroxyl POSS (B) as a plasticizer in PVA film compositions provides at least the following advantages:

(1) The hydroxyl groups make the POSS (B) soluble in polar solvents and increase its miscibility with PVA. A PVA film of high transparency can be formed from a solution comprising polyvinyl alcohol, the multi-hydroxyl POSS, and a polar solvent.

(2) Since the multi-hydroxyl POSS (B) is insoluble in water, the loss of plasticizer in the aqueous processing tanks such as swelling tanks, iodine-dyeing tanks, stretching tanks, and fixation tanks, during fabrication can be reduced or prevented. As the amount of plasticizer in the composition is substantially held, the degradation of elongation, physical properties, and optical properties of PVA films due to plasticizer lost can be avoided. Furthermore, it has been observed that the multi-hydroxyl POSS (B) increases the water contact angle and moisture resistance of the polarizing films.

(3) The multi-hydroxyl POSS (B) has a plurality of hydroxyl groups and Si—O—Si structures capable of forming hydrogen bonding with other OH-containing molecules such as PVA, thereby increasing the mechanical properties. Furthermore, it has been observed that the POSS having a plurality of hydroxyl groups imparts greater improvement in mechanical properties than those without hydroxyl groups.

In one embodiment, the multi-hydroxyl POSS (B) is the only plasticizer in the PVA film composition; that is, completely replacing conventional plasticizers. In other embodiments, the multi-hydroxyl POSS (B) can be used in combination with other conventional plasticizers such as glycols, amines, and polyols, mixed in arbitrary proportions.

Besides the above-described main components, the PVA film composition may further includes one or more additives depending on the end use, for example, a surfactant, a release agent, a dye, a pigment, a crosslinking agent, an adhesion promoter, or combinations thereof.

The PVA films of the invention can be prepared by the following procedure. Polyvinyl alcohol (A) and a multi-hydroxyl POSS (B) are mixed in a polar solvent with a predetermined proportion. The resulting solution is heated to dissolve the polyvinyl alcohol, giving a coating solution having a solid content of about 5-50 wt %. The polar solvent suitable for use herein includes, for example, dimethyl sulfoxide (DMSO), acetamide, ethylene glycol, dimethylformamide, or combinations thereof. The heating procedure may be carried out at temperatures of 40-100° C. for a few hours until the polyvinyl alcohol is completely dissolved. The coating solution is then coated on a substrate such as a glass plate, dried at a temperature of 35-100° C. to provide a dried film. The coating procedure may be achieved by various wet coating techniques such as spin coating, bar coating, roll coating, blade coating, dip coating, and so on.

The PVA films of the invention generally exhibit high tensile strength, high water contact angle, and low water leachability. In preferred embodiments, the PVA film exhibits a tensile strength of above 650 kgf/cm$^2$, a water contact angle of above 60 degrees, and a water leachability of below 7%. In more preferred embodiments, the PVA film exhibits a tensile strength of above 700 kgf/cm$^2$, a water contact angle of above 70 degrees, and a water leachability of below 3.5%.

The PVA films of the invention can be used as optical films, packaging films, agricultural films, laundry bags, cosmetic films, and particularly polarizing films for display devices. The PVA films can be formed by extrusion, flow casting, or other casting methods using PVA formulated solutions.

The manufacturing of a polarizing film involves dyeing the PVA film with dichromatic dyes and stretching the PVA film to control the orientation of the dichromatic dyes. Generally, dyeing is conducted by immersing a PVA film in a bath containing iodine or other dichromatic dyes. Iodine is particularly preferred due to its good orientation ability and dyeability. Stretching is usually conducted by monoaxial stretching for providing desirable optical properties. The stretch ratio is usually not less than 4, preferably not less than 5. If necessary, a dyeing auxiliary such as sodium sulfate may be used in the dyeing process.

Referring to FIG. 1, the PVA film 100 of the invention preferably has a thickness of about 5-100 μm when used as a polarizing film for liquid crystal displays. On at least one surface of the PVA film 100, one or more optical films may be disposed to provide protection, support, or optical compensation. For example, the optical film may include a polarizer protective film 200 having a thickness of about 20-150 μm. The polarizer protective film 200 may be formed of materials selected from triacetyl cellulose (TAC), polyethylene terephthalate (PET), polyethylene naphthalene-2,6-dicarboxylate (PEN), polymethylmethacrylate (PMMA), or polystyrene (PS), wherein triacetyl cellulose (TAC) is particularly preferred. A polarizing plate 300 can be obtained by laminating the PVA film 100 with one or more polarizer protective films 200, as shown in FIG. 1.

The polarizing plate of the invention may be used in manufacturing various visual displays such as liquid crystal displays. For example, the polarizing plate may be installed on one or each of opposite surfaces of a liquid-crystal cell. There is no particular limitation to the kind of liquid-crystal cell or the method of driving the liquid-crystal cell. A suitable cell such as a TN (Twister Neumatic) liquid-crystal cell, a vertically aligned cell, or an IPS (in-plane-switch) cell may be used as the liquid-crystal cell. In addition, the polarizing plate may be installed on other optical products such as projectors and sunglasses.

EXAMPLES

Examples 1-11 and Comparative Examples 1-4

PVA film compositions having the components (and their parts by weight) listed in Tables 1-3 were prepared. The components were thoroughly mixed at a temperature of 80° C. until polyvinyl alcohol was completely dissolved to provide a homogeneous coating solution.

The coating solution was coated on a glass plate, dried at a temperature of 60° C. for 6 hours, and 80° C. for 1 hour, thus forming a PVA film.

The multi-hydroxyl POSS (B) used in Example 1-11 is presented by Formula (VIII), available from Hybrid Plastics under the trade name "Octa(3-hydroxy-3-methylbutyldimethylsiloxy) POSS® AL0136", soluble in polar solvents but insoluble in water.

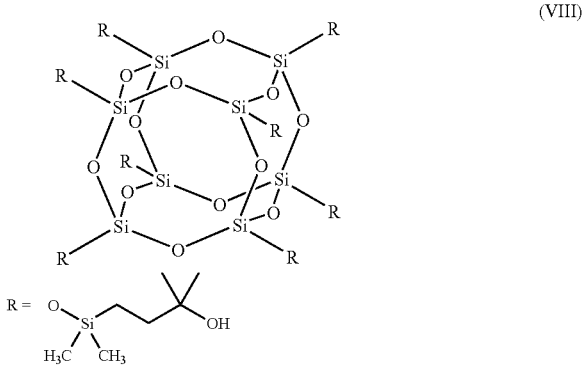

(VIII)

The POSS used in Comparative Example 3 is represented by Formula (IX), available from Hybrid Plastics under the trade name "Tris Sulfonic Acid Isobutyl POSS® SA1533", soluble in water.

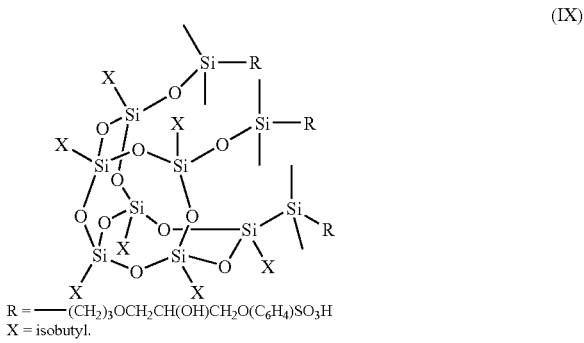

(IX)

R = —(CH$_2$)$_3$OCH$_2$CH(OH)CH$_2$O(C$_6$H$_4$)SO$_3$H
X = isobutyl.

The POSS used in Comparative Example 4 is represented by Formula (X), available from Hybrid Plastics under the trade name "Octa PEG POSS® PG1190", soluble in water.

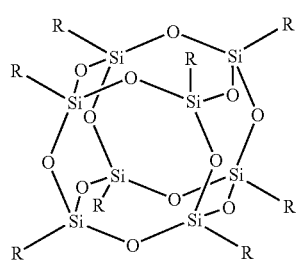

(X)

R = —CH$_2$CH$_2$(OCH$_2$CH$_2$)$_m$OCH$_3$, m = 13.3

PVA Film Test
(1) Tensile strength and elongation: measured according to ASTM D-638 using an Instron 4505 Model test system.
(2) Water contact angle: measured using video contact angle analysis (VCA 2500XE, made by AST Products Inc.)
(3) Thickness: measured using a Mitutoyo 543-251 digimatic indicator with flat anvil (Model 7002).
(4) Water leachability: the PVA film was heated in an oven at a temperature of 105° C. for 1 hour, and the weight loss percentage (W1) was calculated. The PVA film was soaked in water for 3 minutes, and then dried in an oven at a temperature of 105° C. for 1 hour, and the weight loss percentage (W2) was calculated. The water leachability (%) was defined as W2−W1.

Polarizing Film Fabrication

The PVA film was swollen in water at a temperature of 25° C. The swollen PVA film was immersed in an aqueous solution containing iodine (0.4 g/L) and potassium iodide (20 g/L) for 180 seconds in a dyeing tank. The PVA film was uniaxially stretched 5 times its original size in a water tank at a temperature of 25° C., and then stretched to 5.5 times its original size in a fixation tank containing boric acid (50 g/L), and a color patching tank containing potassium iodide (30 g/L). The resulting polarizing film was dried at a temperature of 80° C. for 3 minutes. TAC films with 80 μm thickness (LOFO 6306-1556) was laminated to each of the opposite surfaces of the polarizing film using a 6 wt % PVA aqueous solution as an adhesive, dried at a temperature of 50° C. to form a polarizing plate with 185 μm thickness. The degree of polarization of the polarizing plate was measured using a Perkin Elmer Lambda 900 UV/Vis/NIR Spectrometer according to the following equation:

$$\text{Degree of Polarization} = (Tp-Tc)/(Tp+Tc)*100\%,$$

wherein Tp represents parallel transmission (bright state) and Tc represents perpendicular transmission (dark state).

TABLE 1

PVA film composition (parts by weight)

| PVA film composition | | Example 1 | Example 2 | Example 3 | Example 4 | Example 5 | Comp. Example 1 |
|---|---|---|---|---|---|---|---|
| (A) PVA | a | 10 | 10 | 10 | 10 | 10 | 10 |
| (B) multi-hydroxyl POSS | b-1 | 0.01 | 0.1 | 0.5 | 0.75 | 1 | 0 |
| polyol | c | 0.99 | 0.9 | 0.5 | 0.25 | 0 | 1 |
| solvent | DMSO | 70 | 70 | 70 | 70 | 70 | 70 |
| Thickness (μm) | | 73 ± 2 | 66 ± 2 | 72 ± 5 | 70 ± 1 | 74 ± 1 | 70 ± 1 |
| Tensile strength (kgf/cm$^2$) | | 674 ± 25 | 748 ± 54 | 735 ± 31 | 658 ± 42 | 658 ± 49 | 656 ± 20 |
| Elongation at break (%) | | 327 ± 29 | 363 ± 40 | 359 ± 20 | 341 ± 26 | 343 ± 22 | 345 ± 13 |
| Water contact angle(°) | | 57 ± 1 | 61 ± 1 | 63 ± 1 | 66 ± 2 | 68 ± 1 | 57 ± 1 |
| Water leachability (%) | | 6.7 ± 0.2 | 4.9 ± 0.3 | 3.5 ± 0.1 | 2.4 ± 0.3 | 1.4 ± 0.1 | 7.0 ± 0.2 |
| Degree of polarization (%) at 550 nm wavelength | | 99.96 | 99.97 | 99.90 | 99.93 | 100.0 | 99.97 | a. PVA with a degree of polymerization of 2,700, a degree of saponification of 99.9 mol %
b-1. "Octa(3-hydroxy-3-methylbutyldimethylsiloxy)POSS ® AL0136" from Hybrid Plastics
c. glycerine As shown in Table 1, the PVA film of Comparative Example 1 containing only PVA and glycerine (10:1) had tensile strength of 656±20 kgf/cm$^2$, elongation of 345±13%, water contact angle of 52±1°, and leachability of 7.0±0.2%. On the other hand, the PVA films of Examples 1-4 exhibited higher tensile strength and water contact angle, increasing with increasing amounts of the multi-hydroxyl POSS. Also, water leachability decreased, along with increasing amounts of the multi-hydroxyl POSS. Thus, the lost of plasticizer was effectively reduced. Accordingly, PVA films with improved physical properties, hydrophobicity, and water leachability were obtained. In addition, the elongation (>300%) and the degree of polarization (>99.9%) were not negatively affected by the incorporation of the multi-hydroxyl POSS, and polarizing plates satisfying commercial standards were prepared.

TABLE 2

PVA film composition (parts by weight)

| PVA film composition | | Example 6 | Example 7 | Example 8 | Example 9 | Example 10 | Example 11 | Comp. Example 2 |
|---|---|---|---|---|---|---|---|---|
| (A) PVA | a | 10 | 10 | 10 | 10 | 10 | 10 | 10 |
| (B) multi-hydroxyl POSS | b-1 | 0.1 | 0.25 | 0.5 | 1 | 1.5 | 2 | 0 |
| solvent | DMSO | 70 | 70 | 70 | 70 | 70 | 70 | 70 |
| Thickness (μm) | | 70 ± 2 | 70 ± 2 | 73 ± 2 | 69 ± 1 | 75 ± 1 | 76 ± 1 | 74 ± 2 |
| Tensile strength (kgf/cm$^2$) | | 672 ± 37 | 696 ± 70 | 704 ± 66 | 658 ± 49 | 635 ± 54 | 634 ± 25 | 610 ± 80 |
| Elongation at break (%) | | 290 ± 24 | 309 ± 45 | 323 ± 36 | 343 ± 22 | 284 ± 10 | 278 ± 19 | 242 ± 80 |
| Water contact angle (°) | | 62 ± 3 | 63 ± 1 | 65 ± 3 | 68 ± 1 | 70 ± 2 | 73 ± 2 | 57 ± 1 |
| Water leachability (%) | | 2.2 ± 0.3 | 1.8 ± 0.2 | 1.8 ± 0.2 | 1.4 ± 0.1 | 1.4 ± 0.1 | 1.6 ± 0.2 | 1.8 ± 0.3 |
| Degree of polarization (%) at 550 nm wavelength | | 99.67 | 100.00 | 99.95 | 100.00 | 99.71 | 99.77 | 99.90 | a. PVA with a degree of polymerization of 2,700, a degree of saponification of 99.9 mol %
b-1. "Octa(3-hydroxy-3-methylbutyldimethylsiloxy)POSS ® AL0136" from Hybrid Plastics As shown in Table 2, the PVA film of Comparative Example 2 (no plasticizer) exhibited tensile strength of 610±80 kgf/cm$^2$, elongation of 242±80%, water contact angle of 57±1°, and leachability of 1.8±0.3%. On the other hand, the PVA films of Examples 6-11 exhibited higher tensile strength, elongation, and water contact angle, when compared to Comparative Example 2. Also, water leachability was between 1.4%-2.2%, about the same with that of Comparative Example 2 (no plasticizer). Thus, plasticizer loss was effectively reduced. The degree of polarization of the polarizing plate was above 99.5%, satisfying commercial standards.

TABLE 3

PVA film composition (parts by weight)

| PVA film composition | | Comp. Example 3 | Comp. Example 4 |
|---|---|---|---|
| (A) PVA | a | 10 | 10 |
| Water-soluble POSS | d-1 | 0.25 | 0 |
| Water-soluble POSS | d-2 | 0 | 0.25 |
| polyol | c | 0.75 | 0.75 |
| solvent | DMSO | 70 | 70 |
| Thickness (μm) | | 68 ± 1 | 72 ± 2 |
| Tensile strength(kgf/cm$^2$) | | 685 ± 40 | 658 ± 42 |
| Elongation at break (%) | | 350 ± 22 | 341 ± 26 |
| Water contact angle (°) | | 41 ± 1 | 19 ± 1 |
| Water leachability (%) | | 7.0 ± 0.1 | 8.0 ± 0.6 |
| Degree of polarization (%) at 550 nm wavelength | | 99.98 | 100.00 | a. PVA with a degree of polymerization of 2,700, a degree of saponification of 99.9 mol %
d-1. "Tris Sulfonic Acid Isobutyl POSS ® SA1533" from Hybrid Plastics
c. glycerine
d-2. "Octa PEG POSS ® PG1190" from Hybrid Plastics As shown in Table 3, the PVA films of Comparative Examples 3-4 with water-soluble POSS exhibited higher water leachability than that of Examples 1-11. Although the POSS used in Comparative Example 3 also contained hydroxyl groups that increase tensile strength, its sulfonic acid group made the compound water-soluble and resulted in high water leachability and low water contact angle.

Accordingly, a novel PVA film composition featuring a multi-hydroxyl POSS as a plasticizer was provided. The PVA films made from the above composition are generally characterized by high tensile strength, high water contact angle, and low water leachability. The plasticizer is less prone to being lost in processing tanks during fabrication of polarizing films. Thus, the degradation of elongation, physical properties, and optical properties of PVA films are effectively avoided.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A polyvinyl alcohol film composition, comprising:
    (A) 100 parts by weight of polyvinyl alcohol wherein the polyvinyl alcohol has a degree of polymerization of about 500-10000, and a degree of saponification of above 75 mol %; and
    (B) about 0.001 to 30 parts by weight of a multi-hydroxyl polyhedral oligomeric silsesquioxane (POSS), wherein the multi-hydroxyl POSS is soluble in polar solvents, but insoluble in water,
    wherein the multi-hydroxyl POSS is selected from compounds of Formulas (I)-(VII):

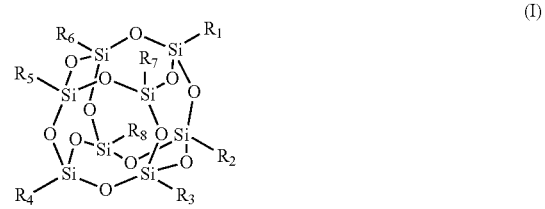

(I)

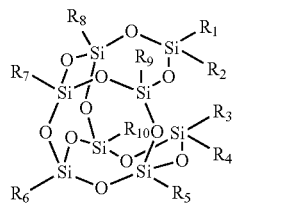
(II)

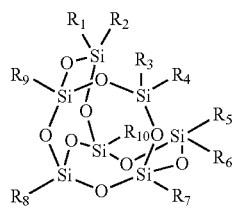
(III)

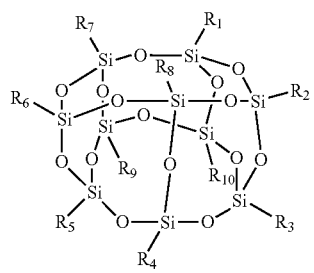
(IV)

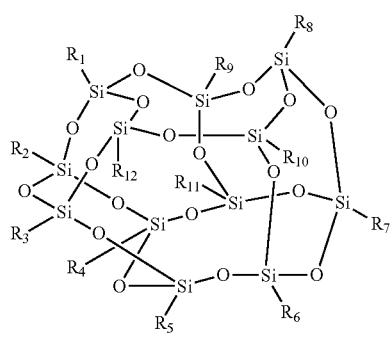
(V)

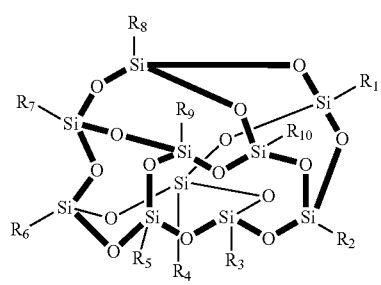
(VI)

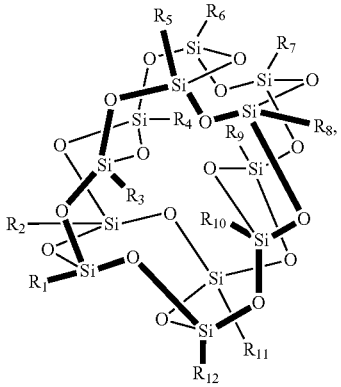
(VII)

wherein each of the $R_1$-$R_{12}$, independently, is a $C_1$-$C_{12}$ aliphatic group or a $C_3$-$C_{14}$ aromatic group, and $R_1$-$R_{12}$ are optionally substituted with hydroxyl groups such that each compound contains at least two hydroxyl groups.

2. The composition as claimed in claim 1, further comprising a plasticizer.

3. The composition as claimed in claim 2, wherein the plasticizer comprises glycols, polyols, amines, or combinations thereof.

4. The composition as claimed in claim 1, further comprising a polar solvent.

5. The composition as claimed in claim 4, wherein the polar solvent comprises dimethyl sulfoxide, acetamide, ethylene glycol, dimethylformamide, or combinations thereof.

6. The composition as claimed in claim 1, further comprising an additive.

7. The composition as claimed in claim 6, wherein the additive is selected from the group consisting of a surfactant, a release agent, a dye, a pigment, a plasticizer, a crosslinking agent, an adhesion promoter, and combinations thereof.

8. A polarizing plate, comprising:
a polarizing film comprising the composition as set forth in claim 1; and
a protective film provided on at least one surface of the polarizing film.

9. The polarizing plate as claimed in claim 8, wherein the protective film comprises triacetyl cellulose (TAC), polyethylene terephthalate (PET), polyethylene naphthalene-2,6-dicarboxylate (PEN), polymethylmethacrylate (PMMA), polystyrene (PS), or combinations thereof.

* * * * *